United States Patent
Hole et al.

(10) Patent No.: US 9,445,337 B2
(45) Date of Patent: *Sep. 13, 2016

(54) CELL RE-SELECTION USING A RANKING ALGORITHM

(75) Inventors: David Philip Hole, Southampton Hampshire (GB); Raghavendra Magadi Rangaiah, Birmingham (GB); Johanna Lisa Dwyer, Brookline, MA (US)

(73) Assignee: BlackBerry Limited, Waterloo, Ontario (CA)

( * ) Notice: Subject to any disclaimer, the term of this patent is extended or adjusted under 35 U.S.C. 154(b) by 511 days.

This patent is subject to a terminal disclaimer.

(21) Appl. No.: 13/989,883

(22) PCT Filed: Nov. 30, 2011

(86) PCT No.: PCT/EP2011/071447
§ 371 (c)(1),
(2), (4) Date: Aug. 23, 2013

(87) PCT Pub. No.: WO2012/072716
PCT Pub. Date: Jun. 7, 2012

(65) Prior Publication Data
US 2014/0057632 A1    Feb. 27, 2014

Related U.S. Application Data

(60) Provisional application No. 61/418,028, filed on Nov. 30, 2010, provisional application No. 61/558,141, filed on Nov. 10, 2011.

(51) Int. Cl.
*H04W 36/30* (2009.01)
*H04W 48/20* (2009.01)

(52) U.S. Cl.
CPC ............ *H04W 36/30* (2013.01); *H04W 48/20* (2013.01)

(58) Field of Classification Search
CPC ... H04W 48/18; H04W 48/20; H04W 36/24; H04W 36/30; H04W 36/0061; H04W 36/0083; H04W 88/06

USPC .......................... 455/436–444; 370/331–334
See application file for complete search history.

(56) References Cited

U.S. PATENT DOCUMENTS

| 6,628,946 B1 * | 9/2003 | Wiberg | H04W 48/12 370/331 |
| 2002/0151304 A1 * | 10/2002 | Hogan | H04W 36/10 455/436 |

(Continued)

FOREIGN PATENT DOCUMENTS

| EP | 2427028 A1 | 3/2012 |
| JP | 2010-531577 A | 9/2010 |

(Continued)

OTHER PUBLICATIONS

Garavaglia et al.; "Inter-System Cell Reselection Parameter Optimization in UMTS," Proceedings of IEEE 16th International Symposium on Personal, Indoor and Mobile Radio Communications; (PIMRC 2005), vol. 3, Sep. 2005; pp. 1636-1640.

(Continued)

*Primary Examiner* — Vladimir Magloire
*Assistant Examiner* — Erica Navar
(74) *Attorney, Agent, or Firm* — Jon Gibbons; Fleit Gibbons Gutman Bongini & Bianco P.L.

(57) ABSTRACT

In accordance with one embodiment, there is provided a method for use by a wireless cellular telecommunications device camped on a first cell. The method comprises, at the device: selecting a parameter applicable to a priority-based re-selection algorithm and also applicable to another cell; measuring an attribute of a signal received from a second cell; and, evaluating the second cell for re-selection according to a ranking algorithm based at least on the selected parameter and the measured attribute. A device and computer readable medium are also provided.

37 Claims, 7 Drawing Sheets

(56) References Cited

U.S. PATENT DOCUMENTS

| | | | | |
|---|---|---|---|---|
| 2008/0227453 | A1* | 9/2008 | Somasundaram | H04W 48/20 455/436 |
| 2010/0056157 | A1* | 3/2010 | Verona | H04W 36/30 455/438 |

FOREIGN PATENT DOCUMENTS

| | | |
|---|---|---|
| KR | 2009-0130293 A | 12/2009 |
| WO | 2008/112255 A2 | 9/2008 |
| WO | 2008/157573 A1 | 12/2008 |
| WO | 2009/053710 A1 | 4/2009 |
| WO | 2010/125769 A1 | 11/2010 |

OTHER PUBLICATIONS

Kolehmainen et al.; "Performance of Idle Mode Mobility State Detection Schemes in Evolved UTRAN," Proceedings of the 5th International Symposium on Wireless Pervasive Computing (ISWPC), May 2010; pp. 584-588.

3GPP TS 45.008 V9.4.0 (Sep. 2010); 3rd Generation Partnership Project; Technical Specification Group GSM/EDGE Radio Access Network; Radio subsystem link control (Release 9); Sep. 2010; (URL: http://www.3gpp.org/ftp/Specs/archive/Specs/archive/45_series/45.008/45008-940.zip); 23 pages.

Canadian Office Action Date dated Apr. 28, 2015 received for Canadian Application No. 2,819,380.

Canadian Office Action from related Canadian Patent Application No. 2,819,380 dated Jul. 30, 2014; 2 pages.

Nokia Siemens Networks et al.; "E-UTRA Measurements and Cell Reselection Considerations," 3GPP Draft; R2-072386 E-UTRA Measurements and Cell Reselection Considerations, 3rd Generatoin Partnership Project (3GPP), vol. RANG WG2; Jun. 22, 2007; XP050135231 (6 pages).

3rd Generation Partnership Project; Technical Specification Group Radio Access Network; Evolved Universal Terrestrial Radio Access (E-UTRA); User Epquipment (UE) procedures in idle mode (Release 9); No. V9.4.0; Oct. 11, 2010; XP050461963 (32 pages).

Korean Office Action dated Oct. 31, 2014, received for related Korean Patent Application No. 10-2013-7017011.

Japanese Office Action dated Apr. 23, 2014 received for related Japanese Patent Application No. 2013-541341.

Korean Notice of Allowance dated May 28, 2015, received for related Korean Application No. 10-2013-7017011.

Japanese Office Action dated Aug. 14, 2014, received for related Japanese Patent Application No. 2013-541341.

Coppieters, Stefaan; Authorized Officer, PCT International Search Report and Written Opinion from related PCT/EP2011/071447 dated Apr. 18, 2012; 12 pages.

3GPP TS 45.008 V9.4.0, "Digital cellular telecommunications system (Phase 2+); Radio subsystem link control," Oct. 2010, pp. 1-148.

3GPP TS 25.304 V8.1.0, "3rd Generation Partnership Project; Technical Specification Group Radio Access Network; User Equipment (UE) procedures in idle mode and procedures for cell reselection in connected mode (Release 8)," Mar. 2008, pp. 1-40.

3GPP TS 03.22 V8.7.0, "3rd Generation Partnership Project; Technical Specification Group GSM/EDGE Radio Access Network; Functions related to Mobile Station (MS) in idle mode and group receive mode; (Release 1999)," Aug. 2002, pp. 1-20.

ETSI TS 123 122 V10.5.0, "Digital cellular telecommunications system (Phase 2+); Universal Mobile Telecommunications System (UMTS); Non-Access-Stratum (NAS) functions related to Mobile Station (MS) in idle mode (3GPP TS 23.122 version 10.5.0 Release 10)," Oct. 2011, pp. 1-46.

ETSI TS 143 022 V10.0.0, "Digital cellular telecommunications system (Phase 2+); Functions related to Mobile Station (MS) in idle mode and group receive mode (3GPP TS 43.022 version 10.0.0 Release 10)," Apr. 2011, pp. 1-26.

* cited by examiner

CELL RE-SELECTION USING A RANKING ALGORITHM

CROSS REFERENCED TO RELATED APPLICATIONS

This application is a national phase application of International Application No. PCT/EP2011/071447, filed on Nov. 30, 2011 which claims the benefit of U.S. Provisional Application No. 61/418,028 filed Nov. 30, 2010 and 61/558,141 filed Nov. 10, 2011, which are incorporated herein by reference in their entirety.

TECHNICAL FIELD

The present disclosure relates to a cellular telecommunications system and, in particular, to a method of cell re-selection in a mobile device camped on a cell of the cellular telecommunications system.

BACKGROUND OF THE DISCLOSURE

In a typical cellular radio system, a wireless telecommunication device communicates via one or more radio access networks (RAN) to one or more core networks. In a UMTS system such devices are typically referred to as User Equipment (UE) and in a GSM system such devices are typically referred to as Mobile Stations (MS). The terms can be considered as equivalent. In the description herein both terms may be used interchangeably, however, it will be noted that the term MS will be used predominantly since the present disclosure relates primarily to cell re-selection from a GSM EDGE Radio Access Network (GERAN) to a UMTS Terrestrial Radio Access Network (UTRAN) or an evolved UMTS Terrestrial Radio Access Network (e-UTRAN). It will be clear, however, that the present disclosure is not limited to this type of cell re-selection.

The Mobile Station (MS) comprises various types of equipment such as mobile telephones (also known as cellular or cell phones), laptops with wireless communication capability and personal digital assistants (PDAs) among others. These may be portable, hand held, pocket sized or installed in a vehicle for example and communicate voice or data signals or both with the radio access network (RAN). Of course the MS may not be mobile, but may be fixed in a location. In this context the term mobile may simply refer to the communication capabilities of the device.

In the following, reference will be made to Global System for Mobile Communications (GSM), Universal Mobile Telecommunications System (UMTS), Long Term Evolution (LTE) and to particular standards. However it should be understood that the present disclosure is not intended to be limited to any particular mobile telecommunications system or standard.

The Radio Access Network (RAN) covers a geographical area divided into a plurality of cells areas. Each cell area is served by at least one base station, which in UMTS may be referred to as a Node B or enhanced Node B in LTE. Each cell may be identified by a unique identifier which is broadcast in the cell. The base stations communicate at radio frequencies over a radio interface with the MSs which are camped on the cell (these may be some or all of the MSs which are within the range of the base station). Several base stations may be connected to a radio network controller (RNC) which controls various activities of the base stations. The RNCs are typically connected to a core network. Each cell implements a particular radio access technology (RAT) such as UMTS Terrestrial Radio Access (UTRA) among others. In a GERAN (Global system for mobile communications (GSM)/Enhanced Data rates for GSM Evolution (EDGE) radio access network), the radio access network may include one or more base stations (BTSs) and one or more Base station controllers (BSCs) which together implement the functionality of the base station subsystem (BSS) in respect of any particular cell.

When idle, a MS will evaluate the properties of detected telecommunications cells, other than the cell it is currently connected to or camped on (often known as the serving cell), in order to identify if the detected or candidate cells would be better suited for connection rather than the serving cell. The process of the MS autonomously changing the serving cell while in idle mode is known as cell re-selection (though re-selection may not be restricted to idle mode or purely autonomous cell change or both). The process by which a MS first camps on a cell following power-up is known as cell selection. The criteria for cell re-selection may include such things as received signal strength and signal quality. Parameters associated with these criteria may be broadcast or otherwise transmitted in the serving cell. One of the requirements for cell re-selection (and selection) may be that the candidate cell is suitable. The criteria for suitability may include criteria related to signal strength and/or signal quality (referring to the signal transmitted by the candidate cell base station, as received by the MS). Some of the criteria that are used in the suitability calculation are based on parameters which must be decoded by the MS after tuning to the frequency of the candidate cell. The decoding of the parameters from the candidate cell can be power intensive for the MS. Regular evaluation based on decoded suitability parameters in this way is particularly undesirable in mobile devices where battery life is limited.

The existing solution to this problem is to store and re-use the most recently decoded suitability criteria parameters. This solution is outlined in the 3GPP TS 45.008 specification V9.4.0, which is incorporated herein by reference and referred to herein as the '45.008 specification'. Section 6.6.5, section 6.6.6 and section 6.6.7 of the 45.008 specification describe the cell re-selection process, entitled "Algorithm for cell re-selection from GSM to UTRAN", "Algorithm for inter-RAT cell re-selection based on priority information" and "Cell selection and re-selection to CSG cells and hybrid cells", respectively. The algorithm defined in Section 6.6.5 may be described as the 'ranking algorithm' and the algorithm defined in Section 6.6.6 may be described as the 'priority-based algorithm'. These terms may be used throughout the description herein.

According to the existing solution, when calculating the suitability of a candidate cell, suitability parameters of a cell from which the suitability parameters were most recently decoded may be used. This solution, although it may reduce the battery usage or long term power requirements of the MS, carries with it inherent limitations. Specifically, for example, it is easy for an MS to discount the suitability of candidate cell and thus not re-select to the cell when it should. This may be because the parameters used to calculate its suitability are incorrect, for example because the suitability parameters of the candidate cell are not the same as those that are being applied. Alternatively, a MS may incorrectly consider a cell as a valid cell for re-selection and proceed to, wastefully, tune to the candidate cell's frequency and decode parameters from that cell. This may be a particular problem if a wide range of threshold parameters are applicable to the cells that the MS could potentially reselect to. When one or more of these threshold are parameters stored, they may be used to incorrectly evaluate another cell in the network for which a different value is applicable.

In an example scenario, an operator may wish that devices in idle mode camp on cells of one frequency, and devices in connected mode, i.e. with active ongoing data or voice calls, operate in cells of a different frequency. The operator may attempt to achieve this by discouraging idle mode re-selection to a particular frequency by means of the suitability criteria, i.e. the suitability criteria are set such that an MS will be very unlikely to meet those criteria. In this scenario, the MS will consistently evaluate the cell for suitability using a considerable amount of power in the process. Additionally, if the MS has stored these incorrect parameters for re-use in the suitability calculation for other cells, the MS may not camp on a cell on which it should.

If a serving cell supports priority-based re-selection it may optionally transmit (including transmitting in broadcast messages) to an MS camped on the cell, an indication of a parameter to be used in the evaluation of a cell as part of a priority-based re-selection algorithm. However, support for priority-based re-selection is optional for non-LTE capable devices. For LTE capable devices, priority-based re-selection must be used. Priority-based re-selection is not supported in any pre-Release 7 devices.

Additionally, there is the possibility that priority-based re-selection is not applicable in the serving cell, for example if the cell is a GERAN cell. It is quite possible that operators will not upgrade GERAN networks to support priority-based re-selection, even when LTE is deployed, for example where there is sparse overlapping LTE coverage. Therefore LTE cells and nearby UTRAN cells most likely will support priority-based re-selection; overlapping or nearby GSM cells may not. A device supporting priority-based re-selection is still required to perform re-selection according to the ranking algorithm, if its current serving cell does not support priority-based re-selection. As such, there may arise scenarios, such as the examples given above, where priority-based re-selection, for whatever reason, is not applicable.

In a scenario in which priority-based re-selection is not applicable and the MS has stored previously decoded parameters, an MS may remain camped on a GSM cell longer than is appropriate when a UMTS or LTE capable cell is available but the MS does not consider it to be suitable (incorrectly). In addition or alternatively, power intensive decoding and calculations may be required on the part of the MS when in idle mode to determine if the cell is suitable re-selection. If the stored threshold is too high, you discount the candidate cell too easily; if the stored threshold is too low, you perform decoding and evaluation when it should not have been needed.

The present disclosure addresses the problem of how to efficiently and effectively evaluate a candidate cell when performing cell ranking re-selection. The present disclosure minimises the need to tune to the frequency of a candidate cell and decode suitability parameters from candidate cells while minimising the risk of discounting a candidate cell incorrectly.

BRIEF DESCRIPTION OF THE DRAWINGS

An example of the present disclosure will now be described in detail with reference to the accompanying drawings, in which.

The same reference numerals used in different figures denote similar elements.

DETAILED DESCRIPTION

Figure 1:
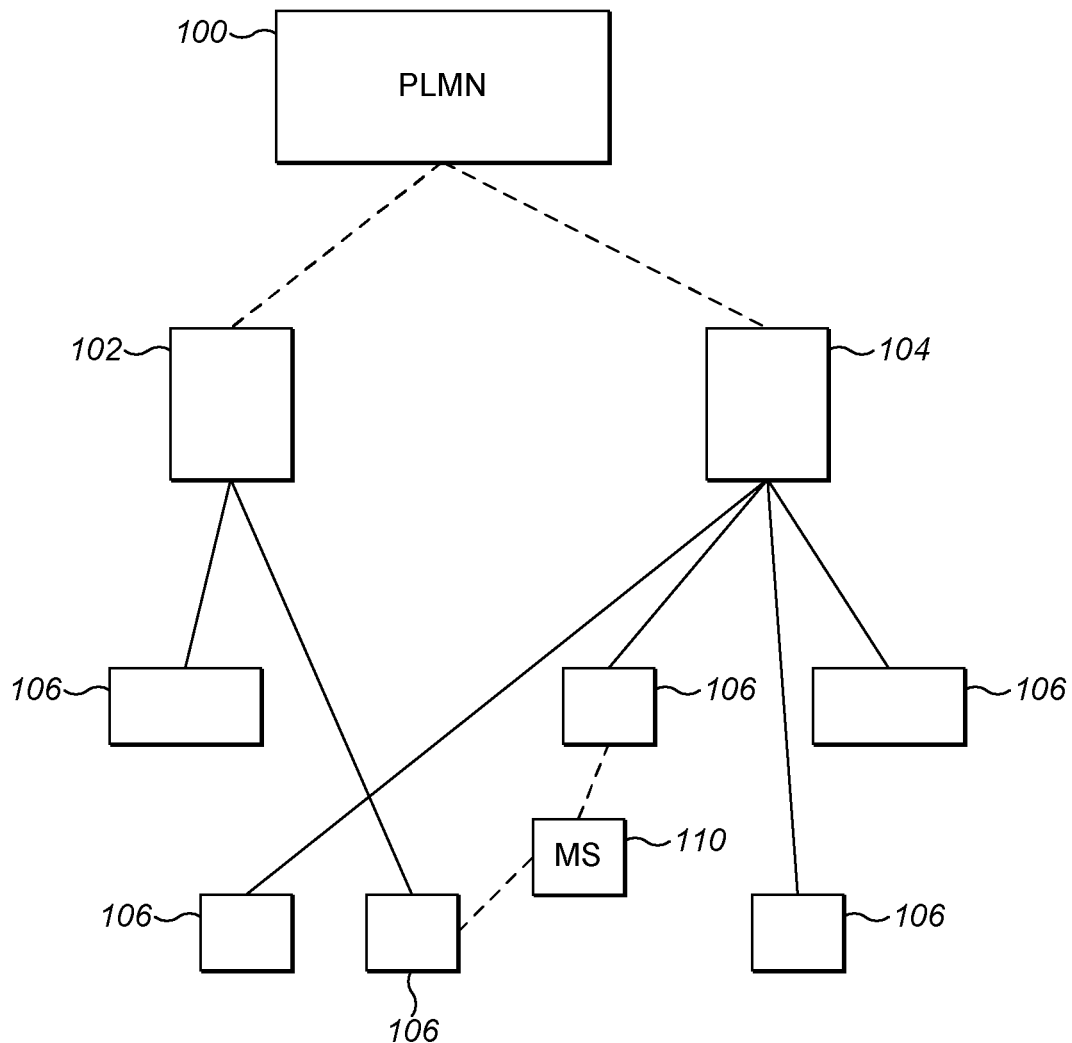
FIG. 1 shows a schematic system suitable for implementing a first embodiment of the present invention.

Embodiments set out in this application relate generally to a method of cell re-selection in an electronic device, particularly to cell re-selection according to a ranking algorithm. Embodiments may efficiently evaluate a candidate cell when performing cell ranking re-selection, without having to tune to the frequency of a candidate cell and decode suitability parameters from that cell every time the calculation is performed and minimising the risk of inappropriately having to tune to the frequency of a candidate cell and decode suitability parameters.

In accordance with one embodiment, a method for use by a wireless cellular telecommunications device camped on a first cell is provided, the method comprising, at the device:

selecting a parameter applicable to a priority-based re-selection algorithm and also applicable to another cell;

measuring an attribute of a signal received from a second cell; and, evaluating the second cell for re-selection according to a ranking algorithm based at least on the selected parameter and the measured attribute.

In certain embodiments, the method may further comprise performing re-selection from the first cell to the second cell based on the evaluation. Additionally, the evaluation may include determining if the cell meets re-selection requirements and in which the second cell is determined not to meet the re-selection requirements if the measured attribute fails to exceed the selected parameter by a pre-determined amount. The pre-determined amount may be zero. Alternatively, the pre-determined amount may be ten decibels (dB).

In certain embodiments, the selecting a parameter applicable to a priority-based re-selection algorithm and also applicable to another cell may include decoding the parameter from system information received in the first cell. In some embodiments, the selecting a parameter applicable to a priority-based re-selection algorithm and also applicable to another cell, may include retrieving the parameter from a data store on the device, the parameter being stored by the device when the device was previously camped on a third cell. Further, the device may have a stored indication of how said parameter was obtained.

In certain embodiments, the parameter may be associated with one or more specific frequencies and may be only applicable to cells operating on one or more specific frequencies. Further, the parameter may be associated with a specific frequency and may be only applicable to cells operating on that frequency.

In certain embodiments, the method may further comprise, if the device fails to determine a parameter applicable to a priority-based re-selection algorithm and also applicable to another cell: evaluating the second cell based at least on the measured attribute and a first stored suitability parameter obtained from a system information block of a cell. Additionally, the first stored suitability parameter is associated with a frequency on which the second cell operates.

In certain embodiments, the method may further comprise, if the first stored suitability parameter is not available: evaluating the second cell based on the measured attribute and a second stored suitability parameter which is obtained from a system information block of a cell of the wireless radio network, the second stored suitability parameter being associated with a frequency on which the second cell does not operate.

In certain embodiments, the first cell is a cell of a GSM EDGE Radio Access Network (GERAN). The parameter may, optionally, indicate a minimum required receive level. Further, the measured attribute may also be received signal code power (RSCP). In certain embodiments, the first and second cells may be of the same wireless radio network. Alternatively, the first and second cells may be of different wireless radio networks. In certain embodiments, the first and second cells are of the same wireless radio access technology. Alternatively, the first and second cells are of different wireless radio access technologies.

In accordance with one embodiment, a wireless cellular telecommunications device being camped on a first cell is provided, the device being adapted, in use, to:
 select a parameter applicable to a priority-based re-selection algorithm and also applicable to another cell;
 measure an attribute of a signal received from a second cell; and,
 evaluate the second cell for re-selection according to a ranking algorithm based in part on the selected parameter and the measured attribute.

In certain embodiments, the device may be further adapted to perform re-selection from the first cell to the second cell based on the evaluation. Additionally, the evaluation may include determining if the cell is suitable for re-selection and in which the second cell is determined not to be suitable if the measured attribute fails to exceed the parameter by a pre-determined amount. The pre-determined amount may be zero. Alternatively, the pre-determined amount may be ten decibels (dB).

In certain embodiments, the selecting a parameter applicable to a priority-based re-selection algorithm and also applicable to another cell may include decoding the parameter from system information received in the first cell. In some embodiments, the selecting a parameter applicable to a priority-based re-selection algorithm and also applicable to another cell, may include retrieving the parameter from a data store on the device, the parameter being stored by the device when the device was previously camped on a third cell. Further, the device may have a stored indication of how said parameter was obtained.

In certain embodiments, the parameter may only applicable to cells operating on one or more specific frequencies. Further, the parameter may be associated with a specific frequency and is only applicable to cells operating on that frequency.

In certain embodiments, if the device fails to determine a parameter applicable to a priority-based re-selection algorithm and also applicable to another cell, the device may be further adapted to: evaluate the second cell based at least on the measured attribute and a first stored suitability parameter obtained from a system information block of a cell. Additionally, the first stored suitability parameter is associated with a frequency on which the second cell operates.

In certain embodiments, if the first stored suitability parameter is not available, the device may be further adapted to: evaluate the second cell based at least on the measured attribute and a second stored suitability parameter which is obtained from a system information block of a cell of the wireless radio network, the second stored suitability parameter being associated with a frequency on which the second cell does not operate.

In accordance with one embodiment, a computer-readable storage medium may be provided having stored thereon instructions which can be executed by a device to carry out the actions of any of the embodiments described herein.

Other aspects and features of the present teaching will become apparent to those ordinarily skilled in the art upon review of the following description of specific embodiments.

Radio Access Networks of the GSM/EDGE (GSM/EDGE Radio Access Network, GERAN), UMTS (UMTS Terrestrial Radio Access Network, UTRAN) or LTE (evolved UMTS Terrestrial Radio Access Network, e-UTRAN) type typically include multiple cells covering a geographical area each of which may implement a different radio access technology (RAT). As described above, a Mobile Station (MS) once connected to a cell, known as the serving cell, may evaluate other detected cells, known as candidate cells, to determine if they would be more suitable for connection than the serving cell. When connected to a cell, the MS is referred to as being camped on the cell. In the description herein the MS may be referred to as being "in a cell", "camped on a cell" or "serving cell". These terms may be used interchangeably and define that the MS is to be paged for downlink data. The description herein may refer to 2G and 3G. 2G may refer to GSM and 3G may refer to UMTS or LTE networks and the terms may be used interchangeably.

Figure 2:
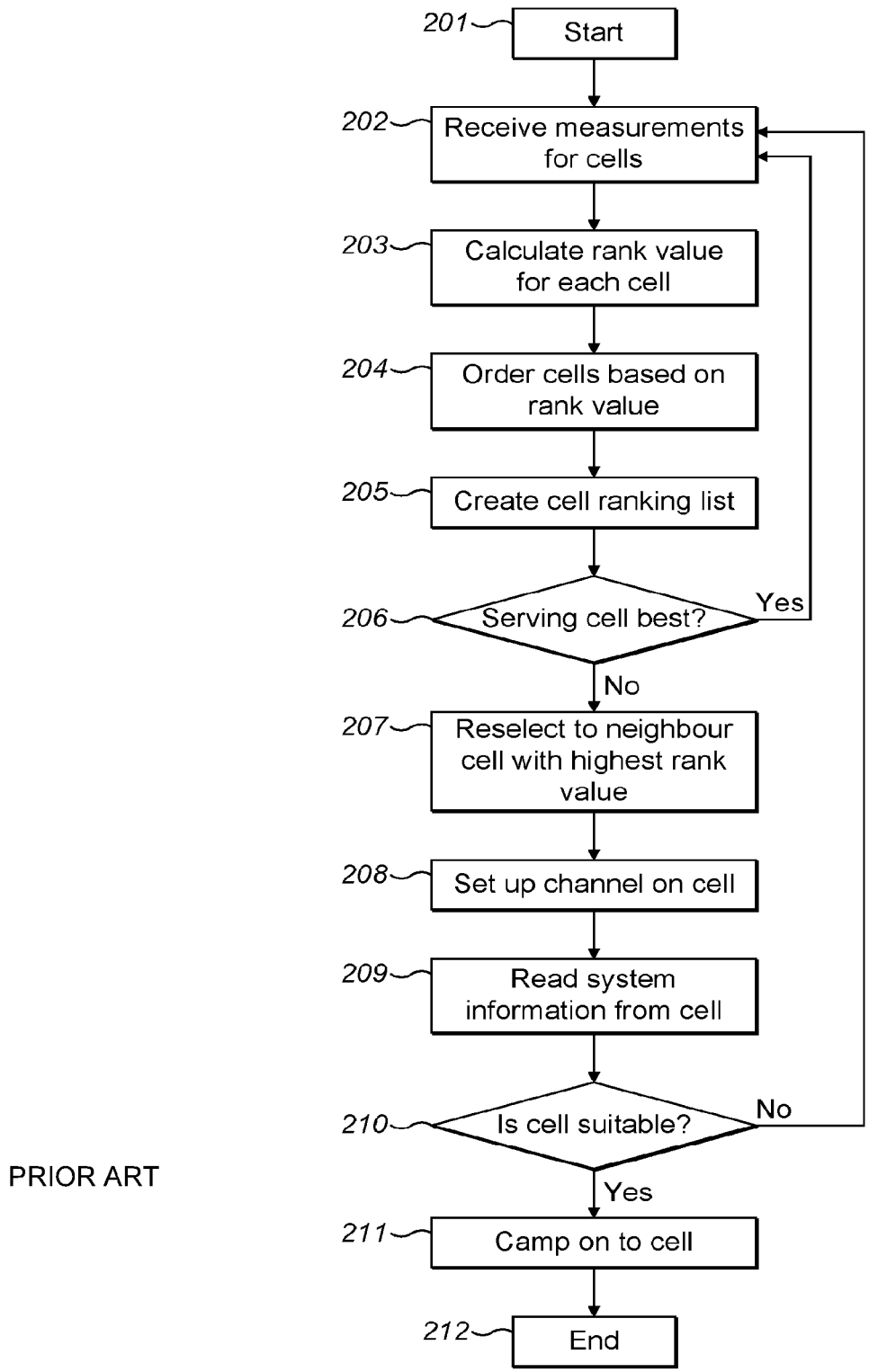
FIG. 2 shows a flow chart of a known ranking algorithm for cell re-selection.

By the terms 'Ranking Algorithm' and 'Priority-Based Re-selection Algorithm' which are used throughout the description herein, we mean the following:

In a ranking algorithm, radio measurements of cells (possibly modified by offsets and/or scaling factors, and possibly subject to minimum thresholds) are compared and re-selection is generally made to the highest thus-ranked cell. In a ranking algorithm, cells on different frequencies, or using different radio access technologies may be compared directly and thus ranked relative to each other. Radio measurements (or derived values for example based on a received cell signal quality or power) are the key basis of comparison of candidate cells. An example of a ranking algorithm is shown in FIG. 2.

In a priority-based re-selection algorithm, cells (typically grouped according to their frequency of operation and/or radio access technology) are assigned priorities. These priorities are the primary means by which cells are considered (radio measurements of the neighbour cells being a secondary consideration) when determining which cell, if any, the device should reselect to. (Note that other considerations may be made, such as based on measurements of the serving cell, in addition to the priority level). According to current 3GPP priority-based re-selection, priorities are assigned on a per-frequency basis (i.e. such that all cells operating using the same radio access technology and same carrier frequency are assigned the same priority), or (in the case of GSM cells) on a per-radio access technology (cells operating according to GSM-based technologies operating on different carrier frequencies may be assigned the same priority). In particular, radio measurements of cells of different priorities need not be compared to each other (though radio measurements may be used for any cell, regardless of its respective priority, to check if it meets minimum camping/service criteria or to evaluate it against a measurement threshold). For example, a cell of one priority can be determined to meet all applicable re-selection criteria, without consideration of any radio measurements of a cell of a lower priority.

FIG. 1 shows a schematic of a network system. Typically each radio access network (RAN) includes radio access devices 106 to provide the radio link between the wireless communications device, the MS 110, and the rest of the radio access network. These radio access devices 106 are known as base stations in GSM and Node Bs in UMTS. The RAN in LTE comprises only e-Node Bs. In GSM and UMTS, the RAN also comprises a Radio Network Controller (RNC) or Base Station Controller (BSC), 102, 104, and the base stations; the RNCs and BSCs are connected to one or more core networks (typically at least one for packet-switched services and one for circuit-switched services). RNCs connect to 3G base stations (node Bs) and BSCs connect to 2G base stations (in which case the combined BSC and base station perform the functionality of a base station subsystem (BSS)), even though they may be physically co-located or even in the same unit. The core network (not shown) is associated with a Public Land Mobile Network (PLMN) 100; it is possible for a single RAN to connect to the core networks of multiple PLMNs (not shown).

Each UMTS cell is uniquely identified by a frequency and a primary scrambling code. Generally a cell refers to a radio network object that can be uniquely identified by a MS 110 from a cell identifier that is broadcast over geographical areas by a base station, node B, e Node B or similar entity. A single physical Node B may generate more than one cell since it may operate at multiple frequencies, or with multiple scrambling codes or both. A candidate cell may be ultimately connected to the same PLMN as the serving cell.

FIG. 2 shows a flow diagram illustrating known processes performed by an MS during a known cell re-selection procedure according to a ranking algorithm. Referring to FIG. 2, the process starts at step 201. At step 202, cell measurements, for example intra-frequency, inter-frequency and inter-RAT cell measurements, are generated or received by the MS. At step 203 rank values are calculated for each cell. In one example these cells are the serving cell and neighbouring cells. One example of the calculation usable to calculate a rank value in the form of cell-ranking criterion R is defined in section 5.2.6.1.4 of the 3GPP TS 25.304 specification, V8.1.0, "User Equipment (UE) procedures in idle mode and procedures for cell re-selection in connected mode" which is incorporated herein by reference and referred to herein as the 25.304 specification (see the calculations for R, for serving cells and R, for neighbouring cells in that section). In that example the rank values are calculated for cells if they satisfy the conditions set in section 5.2.6.1.4 of the 25.304 specification.

At step 204 the cells are ordered based on the rank values. In one example, only cells with rank values better than that of the serving cell are considered and these are compiled in a list. At step 205 the resulting Cell Ranking List is created. At step 206 if the MS finds that the serving cell is best (i.e. has the highest rank value) then the MS remains camped on to the serving cell and the process reverts to step 202.

If at step 206 the MS finds that the serving cell is not the best (i.e. does not have the highest rank value) then at step 207 the MS attempts to reselect to a neighbour cell with the highest rank value. To this end, at 208 a channel (in one example a Primary Common Control Physical Channel (PCCPCH)) is set up, at 209 system information (in one example in the form of Master Information Blocks (MIBs) and System Information Blocks (SIBs)) is read from the neighbour cell and at 210 a check is made that the cell is a suitable cell. A suitable cell is a cell on which a MS may camp; examples include a cell which has acceptable signal strength and/or is not in a forbidden location area and/or is not barred and/or for an automatic search, belongs to the correct Public Land Mobile Network (PLMN). If the cell is suitable the UE camps on to the neighbour cell at 211. If the cell is not a suitable cell, the process reverts to 202. The process ends at 212.

As noted above, the process shown in FIG. 2 requires that a channel be set up on the candidate cell in order to determine the system information from the cell and hence the suitability of the cell for selection. This is particularly power intensive and time-consuming for the MS. If the serving cell is a GERAN cell, then it is likely that it will often be below a neighbouring cell in the ranking list as a result of the ranking calculation. Consequently the MS may be repeatedly be checking the neighbouring cells for suitability and therefore setting up channels on those cells to decode the system information.

It may be the case that the system information received from the neighbouring cells contains a parameter of suitability such that it is unlikely that the MS will ever determine that cell to be suitable. The parameter may have been set by the network operator so that cells cannot camp on that cell. In this scenario, the MS will repeatedly set up a channel on the cell using a large and unnecessary amount of power in the process.

In an example scenario, an operator may wish that devices in idle mode camp on cells of one frequency, and devices in connected mode, i.e. with active ongoing data or voice calls, operate in cells of a different frequency. The operator may attempt to achieve this by discouraging idle mode re-selection to a particular frequency by means of the suitability criteria, i.e. the suitability criteria are set such that an MS will be very unlikely to meet those criteria. In the scenario above, the MS will consistently evaluate the cell for suitability using a considerable amount of power in the process.

It has previously been proposed that, in order to reduce the power requirements of the MS, it may store previously decoded suitability parameters. The reason for requiring storage of suitability criteria is to allow the MS to evaluate a candidate cell, using these criteria, without having to first read the SIBs of the candidate cell (which would otherwise have to be read in order to determine the suitability criteria applicable to that call). In many cases, the cell will not meet the criteria and no further evaluation of this cell is needed; thus, storing criteria from a previous attempt can significantly reduce the battery consumption as SIBs need not be read from cells which do not meet these criteria.

However, such storage may cause problems if the networks are configured as described above, particularly if the stored parameters are associated with (i.e. decoded from) a cell where idle mode re-selection is intended to be restricted, i.e. those with unachievable (or rarely achievable) parameters. Since the stored criteria are unlikely to be met, the MS will not attempt re-selection (noting that the MS may abandon re-selection at this stage, without reading the system information of the target cell and therefore without being able to determine that, in actual fact, the suitability criteria would be met for this cell). In certain circumstances, the MS could remain camped on a GSM cell longer than intended in instances where a UMTS cell would be more appropriate.

Figure 3:
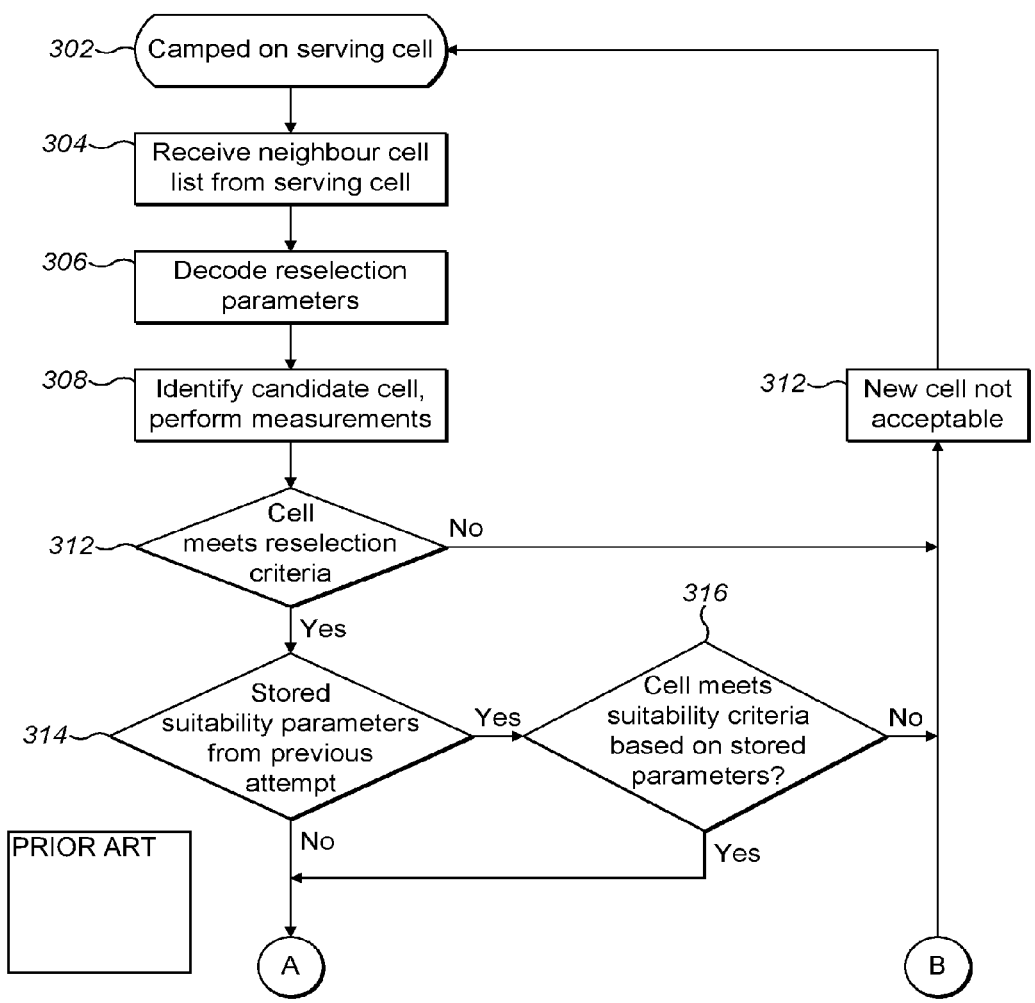
FIG. 3 shows a flow chart of a known method of storing suitability parameters when performing cell re-selection.
Figure 3:
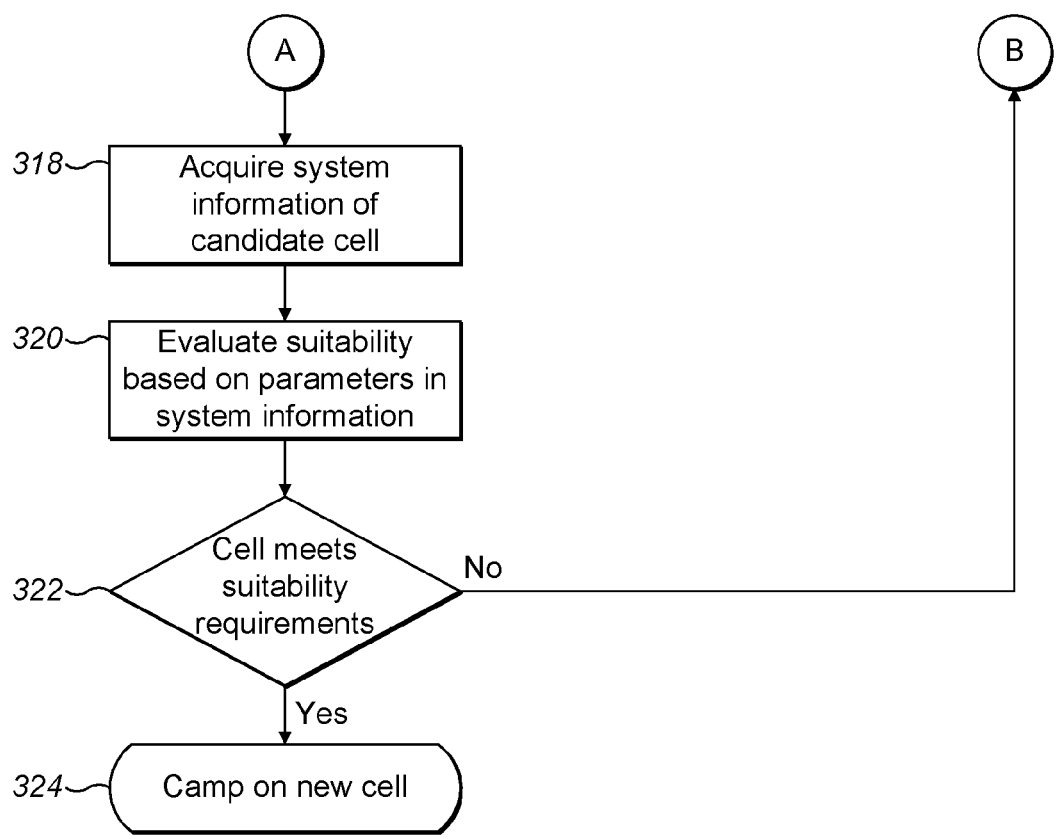

FIG. 3 illustrates the known process of cell re-selection using stored parameters. The algorithms applicable are outlined in the 45.008 specification. Specifically, section 6.6.5, section 6.6.6 and section 6.6.7 of the 45.008 specification, entitled "Algorithm for cell re-selection from GSM to UTRAN", "Algorithm for inter-RAT cell re-selection based on priority information" and "Cell selection and re-selection to CSG cells and hybrid cells", respectively.

The illustrated process starts at step 302 with the MS camped on the serving cell. Depending on the configuration and the algorithm used, the neighbour cell is received from the serving cell (step 304) and the re-selection parameters are decoded from that list (step 306). The MS then identifies a candidate cell and performs measurements (step 308). These may include signal strength and signal quality among others. Next, at step 310, the MS determines if the candidate cell meets the re-selection criteria. This test may be limited to those criteria which can be derived from parameters received in the serving cell. In some cases, depending on the parameters broadcast in the serving cell and whether or not it has stored suitability parameters, the MS may omit evaluating the candidate cell based on stored suitability parameters. If the candidate cell does not meet the re-selection criteria, the process restarts as the cell is not acceptable (step 312).

Between steps 312 and 314 (not shown), if the serving cell transmits Received Signal Code Power (RSCP) parameters to be used in lieu of the 'suitability test' within the re-selection algorithm, then the candidate cell is evaluated against these regardless of whether it has stored suitability parameters or not. If this test is done and passed (not shown), the process moves to step 318.

If the candidate cell is acceptable, the MS checks if it has stored suitability parameters from a previous attempt (step 314). If it does, the candidate cell is evaluated to determine if it meets suitability criteria based on these stored parameters (step 316). If the candidate cell does not meet the suitability criteria, the cell is deemed unacceptable and the process is restarted (step 312). If the cell does meet the suitability criteria based on the stored parameters, then the MS sets up a channel on the cell and acquires system information from the candidate cell (step 318). Similarly, if the MS does not have stored suitability parameters from a previous attempt, the MS sets up a channel on the cell and acquires system information from the candidate cell (step 318).

The suitability of the cell is then evaluated using parameters in the system information (step 320). If the candidate cell meets the suitability criteria, the MS camps on the cell (step 324). If the candidate cell does not meet the suitability requirements, the cell is deemed not acceptable (step 312) and the MS remains camped on the serving cell.

Section 6.6.5, "Algorithm for cell re-selection from GSM to UTRAN", outlines the algorithm for determining the re-selection suitability described above and based on a ranking algorithm. The ranking algorithm is used where priority based re-selection is not, for example, due to network configuration or device capability. Typically, priority-based re-selection is preferred. For example, a device which is capable of LTE must support priority-based re-selection. In the ranking algorithm, one criteria for re-selection from GERAN to UTRAN may be referred to as CPICH RSCP-based criteria. CPICH stands for common pilot channel and RSCP stands for Received Signal Code Power. For reference, an excerpt of the algorithm defined in section 6.6.5 of the 45.008 specification is as follows, where FDD stands for Frequency Division Duplex and MS for Mobile Station:

"If the 3G Cell Re-selection list includes UTRAN frequencies, the MS shall, at least every 5 s update the value RLA_C for the serving cell and each of the at least 6 strongest non-serving GSM cells.

The MS shall then reselect a suitable (see TS 25.304) UTRAN cell if:
 for a TDD cell the measured RSCP value exceeds the value of RLA_C
 for the serving cell and all of the suitable (see 3GPP TS 03.22) non-serving GSM cells by the value XXX_Qoffset for a period of 5 s and
 for an FDD cell the following criteria are all met for a period of 5 s:
  1. its measured RSCP value exceeds the value of RLA_C for the serving cell and all of the suitable (see 3GPP TS 03.22) non-serving GSM cells by the value XXX_Qoffset,
  2. its measured Ec/No value is equal or greater than the value FDD_Qmin, and
  3. its measured RSCP value is equal to or greater than FDD_RSCP_threshold, if supported by the MS.

In case of a cell re-selection occurring within the previous 15 seconds, XXX_Qoffset is increased by 5 dB where
 FDD_RSCP_threshold equals Qrxlevmin+Pcompensation+10 dB, if these parameters are available, otherwise $-\infty$ (criterion not effective).
 Qrxlevmin is the minimum required RX level in the UTRAN FDD cell (dBm), see 3GPP TS 25.304.
 Pcompensation is max (UE_TXPWR_MAX_RACH–P_MAX, 0) (dB), see 3GPP TS 25.304.
 UE_TXPWR_MAX_RACH is the maximum TX power level an MS may use when accessing the UTRAN FDD cell on RACH (dBm), see 3GPP TS 25.304.
 P_MAX is the maximum RF output power of the MS (dBm) in UTRAN FDD mode, see 3GPP TS 25.304.
 FDD_Qmin and XXX_Qoffset are broadcast on BCCH of the serving cell. XXX indicates other radio access technology/mode.

Note: The parameters required to determine if the UTRAN cell is suitable are broadcast on BCCH of the UTRAN cell. An MS may start re-selection towards the UTRAN cell before decoding the BCCH of the UTRAN cell, leading to a short interruption of service if the UTRAN cell is not suitable.

The MS may store the UTRAN cell RSCP suitability criterion parameters above, whenever decoded from a UTRAN FDD cell of an equivalent PLMN. The most recently decoded parameters are valid re-selection criteria towards all UTRAN FDD cells. This list of parameters shall be cleared after PLMN selection (see 3GPP TS 23.122)."

It should be noted that the definition of suitable in the above algorithm requires that the cell selection criteria be met. These criteria for UMTS cells are defined in the 3GPP TS 25.304 specification sub-clause 5.2.3.1.2. The suitability parameters referred to are the Qrxlevmin and Pcompensation (which depends on UE_TXPWR_MAX_RACH).

For later releases of the specification, the phrase "if supported by the MS" in item 3 above was removed, making this consideration mandatory for user equipment complying with later releases of the specifications.

The definition of FDD_RSCP_threshold has also been previously modified to read as follows:

"FDD_RSCP_threshold equals FDD_RSCPmin–min ((P_MAX–21 dBm), 3 dB) if FDD_RSCPmin is broadcast on the serving cell, else Qrxlevmin+Pcompensation+10 dB, if these parameters are available, otherwise the default value of FDD_RSCPmin."

Additionally, the paragraph starting "The MS may store" of the algorithm was updated to read as follows:

"The MS shall store the UTRAN cell RSCP suitability criterion parameters above, whenever decoded from a UTRAN FDD cell of an equivalent PLMN while attempting to camp on the UTRAN FDD cell. The most recently decoded parameters from one UTRAN FDD cell of an equivalent PLMN are valid re-selection criteria towards all UTRAN FDD cells. This list of parameters shall be cleared after PLMN selection (see 3GPP TS 23.122)."

This change was made for the following reasons:

"If the FDD_RSCPmin parameters are not provided in the broadcast of the GSM serving cell, the FDD_RSCP_threshold is derived from broadcast information of the UTRAN cells. These parameters could be different for each UTRAN cell.

It is unclear from which UTRAN cell and when the MS shall read these parameters and when they should be re-read. Furthermore it is unclear whether a parameter set of one UTRAN cell is valid for the re-selection towards all cells or only towards the UTRAN cell from which the parameters were read."

When this change to the specification was made, a summary was given as follows:

"It is clarified that the MS shall refresh the parameter set when attempting to camp on a UTRAN FDD cell of an equivalent PLMN and thus is not required to read this parameter from the UTRAN neighbour cells while camping on a GSM cell.

It is further clarified, that the parameters received from one UTRAN cells are valid re-selection criteria towards all UTRAN FDD cells."

As stated previously, the reason for requiring storage of suitability criteria is to allow the MS to evaluate a candidate cell, using these criteria, without having to first read the System Information Blocks (SIBs) of the candidate cell (which would otherwise have to be read in order to determine the suitability criteria applicable to that cell). In many cases, the cell will not meet the criteria and no further evaluation of this cell is needed; thus, storing criteria from a previous attempt can significantly reduce the battery consumption as SIBS need not be read from cells which do not meet these criteria.

It was mentioned above that Section 6.6.5 applies only where priority based re-selection does not. Specifically, Section 6.6.5 states: "The algorithm in this subclause shall be used for re-selection from GSM to UTRAN if the conditions for the use of the cell re-selection algorithm based on priority information (see subclause 6.6.6) are not satisfied". Section 6.6.6, "Algorithm for inter-RAT cell re-selection based on priority information", defines that priority-based re-selection criteria allow an operator to configure a set of cells (on the same frequency and using the same RAT) as having a particular priority; different priorities can be assigned to different RATs or frequencies or both. Multiple frequencies of the same RAT may share a priority level. Two frequencies cannot share a priority level if they are used for different RATs. As with the algorithm defined in section 6.6.5 and discussed above, there is a requirement that the target or candidate cell be suitable as defined in the 25.304 specification and described above. For reference, an excerpt of the algorithm defined in section 6.6.6 of the 45.008 specification is as follows:

"The MS shall then reselect a suitable (see 3GPP TS 25.304 for UTRAN and 3GPP TS 36.304 for E-UTRAN) cell of another radio access technology if the criteria below are satisfied. S_non-serving_XXX is the measurement quantity of a non-serving inter-RAT cell and XXX indicates the other radio access technology/mode and is defined as follows:

for a UTRAN cell, is the measured RSCP value for the cell minus UTRAN_Qrxlevmin for the cell's frequency;

for a E-UTRAN cell, is the measured RSRP value for the cell minus E-UTRAN_Qrxlevmin for the cell's frequency if THRESH_E-UTRAN_high_Q is not provided; otherwise, if THRESH_E-UTRAN_high_Q is provided, is the measured RSRQ value for the cell minus E-UTRAN_QQUALMIN for the cell's frequency.

( . . . )

Cell re-selection to a cell of another inter-RAT frequency shall be performed if any of the conditions below (to be evaluated in the order shown) is satisfied:

The S_non-serving_XXX of one or more cells of a higher priority inter-RAT frequency is greater than THRESH_XXX_high (or, in case of an E-UTRAN target, THRESH_E-UTRAN_high_Q, if provided) during a time interval T_re-selection; in that case, the mobile station shall consider the cells for re-selection in decreasing order of priority and, for cells of the same inter-RAT frequency or of inter-RAT frequencies of equal priority, in decreasing order of S_non-serving_XXX, and reselect the first cell that satisfies the conditions above;

the value of S_GSM is lower than THRESH_GSM low for the serving cell and all measured GSM cells during a time interval T_re-selection; in this case, the mobile station shall consider for re-selection the inter-RAT cells in the following order, and reselect the first one that satisfies the following criteria:

cells of a lower priority inter-RAT frequency whose S_non-serving_XXX is greater than THRESH_XXX_low (or, in case of an E-UTRAN target, THRESH_E-UTRAN_low_Q, if provided) during a time interval T_re-selection; these cells shall be considered in decreasing order of priority and, for cells of the same RAT, in decreasing order of S_non-serving_XXX;

if no cells satisfy the criterion above, inter-RAT cells for which, during a time interval T_re-selection, S_non-serving_XXX is higher than S_GSM for the serving cell by at least a specific hysteresis H_PRIO; these cells shall be considered in decreasing order of S_non-serving_XXX.

A UTRAN FDD cell shall only be reselected if, in addition to the criteria above, its measured Ec/No value is equal to or greater than FDD_Qmin–FDD_Qmin_Offset.

If E-UTRAN_Qmin is provided for a E-UTRAN frequency, a E-UTRAN cell on that frequency shall only be reselected if, in addition to the criteria above, its measured RSRQ value is equal to or greater than E-UTRAN_Qmin.

If THRESH_E-UTRAN_high_Q is provided for a E-UTRAN frequency, and if E-UTRAN_RSRPmin is provided, a E-UTRAN cell on that frequency shall only be reselected if, in addition to the criteria above, its measured RSRP value is equal to or greater than E-UTRAN_RSRPmin. If E-UTRAN_RSRPmin is not provided, the default value shall be used.

E-UTRAN cells which are included in the list of not allowed cells shall not be considered as candidates for cell re-selection. If the strongest cells on a E-UTRAN frequency are included in the list of not allowed cells, the mobile station may reselect the strongest valid cell (see subclause 8.4.7) on that frequency.

Cell re-selection to a cell of another radio access technology (e.g. UTRAN or E-UTRAN) shall not occur within 5 seconds after the MS has reselected a GSM cell from an inter-RAT cell if a suitable GSM cell can be found.

If the mobile station applies either common priorities or individual priorities received through dedicated signalling and priorities are available only for some inter-RAT frequencies, cells belonging to frequencies for which no priority is available or no threshold is provided by the serving cell shall not be considered for measurement and for cell re-selection.

If a mobile station in 'camped normally' state (see 3GPP TS 43.022) applies individual priorities received through dedicated signalling and no priority is available for the serving cell, the mobile station shall consider any GSM cell (including the serving cell) to have lowest priority (i.e. lower than the eight network configured values).

A mobile station in 'camped on any cell' state (see 3GPP TS 43.022) shall ignore individual priorities received through dedicated signalling and shall apply priorities received from the system information of the serving cell while attempting to find a suitable cell. If the mobile station supports CS voice services, the MS shall avoid reselecting acceptable (but not suitable) E-UTRA cells regardless of the priorities provided in system information.

NOTE 4: If the MS is camping on an acceptable cell, individual priorities are not discarded until an event leading to their deletion occurs."

If a cell supports priority-based re-selection according to section 6.6.6 of the 45.008 specification, it will transmit to an MS camped on the cell a list of its neighbouring cells—the 'neighbour cell list' (this may identify individual cells, or frequencies on which neighbour cells operate, or both). Along with the list, a System Information Type 2quater (SI2quater) message may indicate a parameter applicable to one or more cells in the list, referred to as UTRAN_Qrxlevmin in the excerpt above. This parameter of the candidate cell, which is broadcast in the serving cell, i.e. the UTRAN_Qrxlevmin, is expected in normal operation to be closely related to the corresponding RSCP threshold sent by the candidate cell as used in the suitability check. As such, this parameter allows the MS to identify if the cell meets an RSCP-based criterion without power intensive decoding and evaluation of system information broadcast by the candidate cell unless that criterion is met.

However, support for priority-based re-selection remains optional for non-LTE capable devices. For LTE capable devices priority based re-selection must be used. Moreover, priority-based re-selection is not supported in any pre-Release 7 devices. In addition, there is the possibility that priority-based re-selection is not applicable in the serving cell, for example if the cell is a GERAN cell. It is quite possible that operators will not upgrade GERAN networks to support priority-based re-selection, even when LTE is deployed, especially near the edges of LTE coverage. Therefore, while LTE cells or UTRAN cells most likely will support priority-based re-selection, overlapping or nearby GSM cells may not. A device supporting priority-based re-selection is required to use the old 6.6.5 rules, i.e. re-selection according to the ranking algorithm in such a case. In this scenario the problems described above are applicable; in that an MS may remain camped on a GSM cell longer than is appropriate when a UMTS or LTE capable cell is available but the MS does not consider it to be suitable or power intensive calculations are required.

The priority-based re-selection (PBR) RSCP threshold parameter broadcast in the serving cell is optional and is set up in the network configuration. The parameter is likely to be (or correlate with) the minimum required measured RSCP level. Additionally, the PBR parameter may be broadcast as a specific value and associated with one or more explicitly signalled frequencies, or may be broadcast as a 'default' value to be used with cells of frequencies not explicitly signalled together with the parameter value. The parameter is applicable only to cells which operate on the same frequency associated with the parameter. The default value only applies to frequencies in the neighbour cell list. An example of a broadcast default parameter is the DEFAULT_UTRAN_QRXLEVMIN parameter encoded within the 3G Priority Parameters Description Struct; an example of an parameter associated with explicitly signalled frequencies is the UTRAN_QRXLEVMIN parameter encoded within the Repeated UTRAN Priority Parameters struct (see 3GPP TS 44.018 v.10.3.0). If no parameter is broadcast in the cell, the algorithm specifies a value to be used, i.e. as the UTRAN_Qrxlevmin, in this scenario. The PBR parameter may not have been broadcast in the cell due to network configuration or may not have been received fully by the MS.

An example of the characteristics of the parameters described above is as follows:

The currently stored Qrxlevmin value (obtained from a 3G cell) has a range of −115 to −24 dBm, and there is no default value, since its inclusion in the 3G cell's system information is mandatory. Qrxlevmin is a suitability parameter for that cell.

Pcompensation is a further suitability parameter derived (at least partly) from one or more parameters broadcast in the cell also currently referred to in Section 6.6.5 of the 45.008 specification. Its value is most likely to be 0 dB.

Legacy, optional information in SI2quater for use in the ranking algorithm:

```
< 3G Additional Measurement Parameters Description struct > ::=
    < FDD_Qmin_Offset : bit (3) >
    -- FDD Parameters
    < FDD_RSCPmin : bit (4) > ;
```

Note that for FDD_RSCPmin, the range is −114 to −84 dBm, and the default is −102 dBm, which applies if there is no stored Qrxlevmin value available and no signalled FDD_RSCPmin.

Priority-based re-selection parameters in SI2quater introduced in Release 8 for priority-based re-selection:

```
< Priority and E-UTRAN Parameters Description struct > ::=
    { 0 | 1 < Serving Cell Priority Parameters Description :
        < Serving Cell Priority Parameters Description struct >> }
    { 0 | 1 < 3G Priority Parameters Description :
        < 3G Priority Parameters Description struct >> }
    { 0 | 1 < E-UTRAN Parameters Description :
        < E-UTRAN Parameters Description struct >> } ;
< 3G Priority Parameters Description struct > ::=
    < UTRAN_Start : bit >
    <UTRAN_Stop : bit >
    { 0 | 1 < DEFAULT_UTRAN_PRIORITY : bit(3) >
        < DEFAULT_THRESH_UTRAN: bit(5) >
        < DEFAULT_UTRAN_QRXLEVMIN: bit(5) > }
    { 1 < Repeated UTRAN Priority Parameters : < Repeated
      UTRAN Priority Parameters struct >> } ** 0 ;
DEFAULT_UTRAN_QRXLEVMIN (5 bit field)
```

These fields are used for the inter-RAT cell re-selection algorithm based on priority, as defined in 3GPP TS 45.008. Any UTRAN frequency included in the 3G Cell Re-selection list which is not explicitly listed in the Repeated UTRAN Priority Parameters structure shall be assigned these default parameter values. [ . . . ]; the DEFAULT_UTRAN_QRXLEVMIN field is encoded as the UTRAN_QRXLEVMIN field.

Any parameter present overwrites any old data held by the mobile station for these parameters.

```
< Repeated UTRAN Priority Parameters struct > ::=
    { 1 < UTRAN_FREQUENCY_INDEX : bit (5) > } ** 0
    { 0 | 1 < UTRAN_PRIORITY : bit(3) > }
    < THRESH_UTRAN_high : bit(5) >
    { 0 | 1 < THRESH_UTRAN_low : bit(5) > }
    { 0 | 1 < UTRAN_QRXLEVMIN: bit(5) > } ;
```

Table 1 gives an existing definition of UTRAN_QRX-LEVMIN from 3GPP TS 45.008 (the last 3 columns indicate range, number of bits used to encode the parameter, channel on which the information is sent—broadcast control channel, downlink):

TABLE 1

| UTRAN_QRXLEVMIN | Minimum required RX level for cells on the target UTRAN frequency (dBm), 0 = −119 dBm, 1 = −117 dBm, 2 = −115 dBm, . . . , 30 = −59 dBm, 31 = −57 dBm. Default value = −119 dBm. | 0-31 | 5 | BCCH D/L |
|---|---|---|---|---|

There are multiple possible combinations of presence/absence of UTRAN_QRXLEVMIN applicable to the frequency of interest, and of the DEFAULT_UTRAN_QRX-LEVMIN parameter. The following table specifies which value applies in each case:

process starts with the MS being camped on a GSM cell (step 400). It is irrelevant whether the MS camped on the serving cell by using cell re-selection or cell selection. Optionally, the MS will acquire the UMTS or LTE neighbour cell list. This may be broadcast in the serving cell or may be acquired otherwise (step 402). Again optionally, the MS may also acquire the FDD_RSCPmin if it is available (step 404). FDD_RSCPmin is a value that may or may not be available in the serving GSM cell depending on the configuration of the cell by the network operator. It defines a minimum threshold of RSCP for UTRAN FDD cell re-selection.

Figure 4:
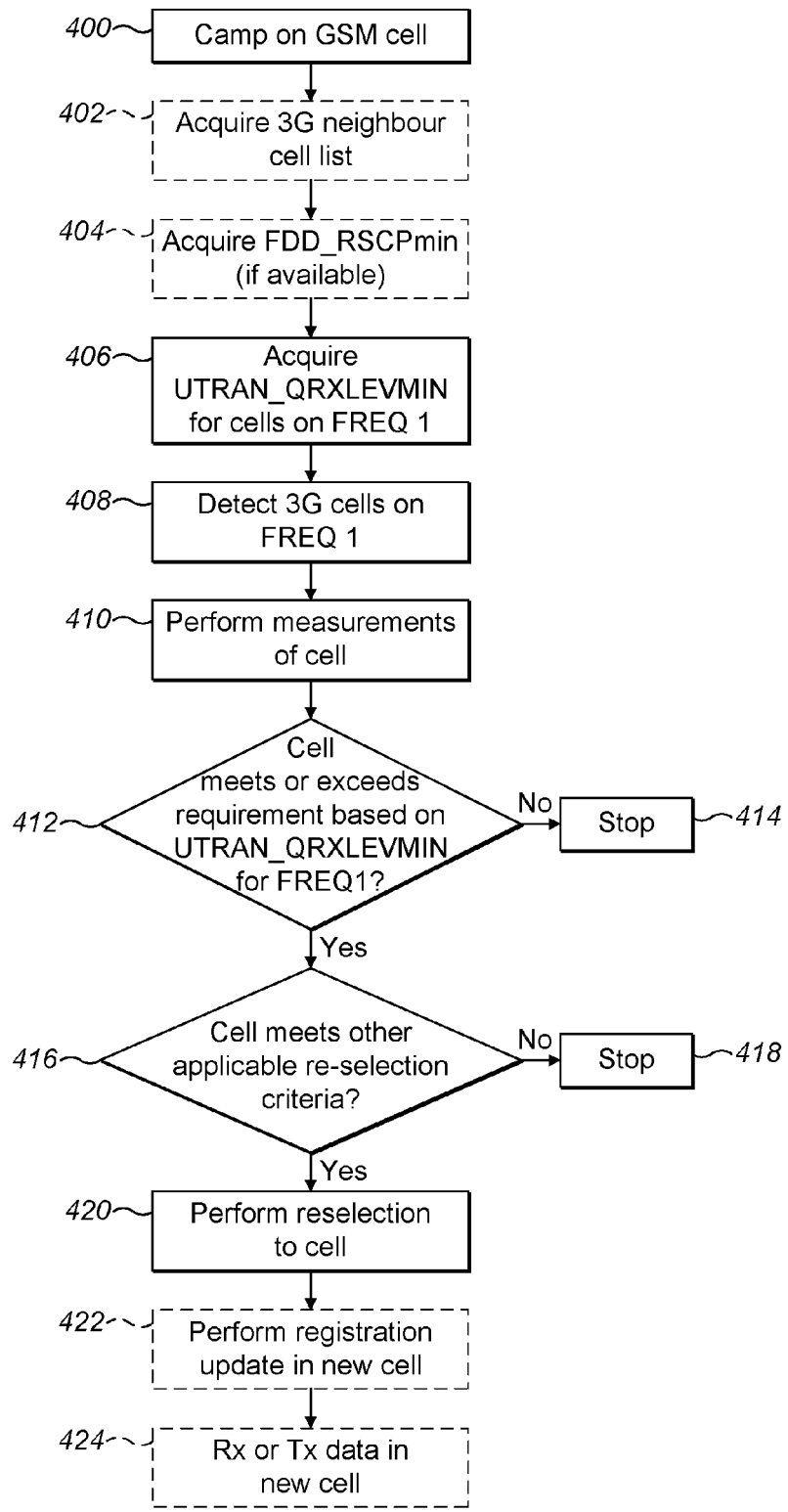
FIG. 4 shows a flow chart illustrating an example of the present disclosure.

At step 406, the MS acquires the UTRAN_Qrxlevmin values. As described above, this value is a parameter sent together with or as part of priority-based re-selection information. The MS may have previously acquired the value from a different cell, regardless of the RAT of that cell. As such, it will be understood that the particular order of the flow chart of FIG. 4 is not essential. The value of UTRAN_Qrxlevmin may be associated with a particular frequency, referred to here as FREQ1.

At step 408, it is illustrated that the MS detects 3G cells which are on frequency FREQ1, i.e. the same frequency associated with the priority-based re-selection parameter

TABLE 2

| Ref | DEFAULT_UTRAN_QRXLEVMIN present? | Instance of Repeated UTRAN Priority Parameters struct for frequency of Interest? (see note 1 below) | Repeated UTRAN Priority Parameters struct contains UTRAN_QRXLEVMIN? | Value taken from: |
|---|---|---|---|---|
| 1 | (don't care) | Yes | Yes | UTRAN_QRXLEVMIN in Repeated UTRAN Priority Parameters struct |
| 2 | Yes | Yes | No | Not currently specified: reasonable options include either 1) Specified default value for the parameter (−119 dBm as per 3GPP TS 45.008) or 2) DEFAULT_UTRAN_QRXLEVMIN |
| 3 | Yes | No | n/a | DEFAULT_UTRAN_QRXLEVMIN |
| 4 | No | No | n/a | Specified default value for the parameter (−119 dBm as per 3GPP TS 45.008, see above) |

Note 1:
In Table 2 above, the Repeated UTRAN Priority Parameters struct is associated with one or more frequencies, identified by the UTRAN_FREQUENCY_INDEX value(s) encoded within it. The "frequency of interest" in this context means the frequency on which the candidate cell is operating.

Example of the Present Disclosure

In accordance with the present disclosure, it is proposed that parameters received as part of a priority-based re-selection algorithm are used when evaluating a candidate cell according to a ranking algorithm. The priority-based parameters may have been received at the MS from the serving cell or a previous serving cell or a previous non-serving cell.

FIG. 4 shows a flow chart representing a specific example of the present disclosure. In the specific example, the (UTRAN_Qrxlevmin). The MS may then perform measurements of the cell to identify characteristics of the cell such as signal strength or signal quality (step 410).

At step 412, the priority-based re-selection (PBR) parameter, i.e. UTRAN_Qrxlevmin for that cell's frequency FREQ1, is used to determine if the candidate cell is suitable for re-selection. If the candidate cell does not meet or exceed the requirements based on this parameter, for example the characteristics of a signal received by the MS from the cell do not exceed the threshold, the process stops and the MS remains camped on the GSM cell (step 414).

If, based on the PBR parameter UTRAN_Qrxlevmin for FREQ1, it is determined that the candidate cell meets or exceeds the requirement then the MS may perform re-selection to the candidate cell (step 420). It should be noted that the attribute(s) of the cell may have to exceed the threshold by a predetermined amount, which may for example be 0 dB or +10 dB. Optionally, if the cell does not meet other applicable re-selection criteria (step 416), the process may stop and the MS may remain camped on the GSM cell and re-selection may not be performed to the candidate cell (step 418).

Additionally and optionally, a registration update may be performed when the MS has camped in the new cell (step 422). This registration update may explicitly notify the network that the MS has re-selected to a new cell or new registration area. Additionally and optionally, data may be transmitted and received to and from the network in the new cell (424). The registration update step (step 422) may include for example a routing area update, location update, combined routing area update or similar. For further information regarding registration updates please see the 3GPP TS 24.008 specification, "Mobile radio interface Layer 3 specification; Core network protocols; Stage 3", which is incorporated herein by reference.

In addition to the use of PBR parameters in the ranking algorithm, according to the present disclosure, prioritisation or precedence schemes are provided that outline preferred ordering of which parameter should be used by the MS.

In order to determine the precedence rules, it may be advisable to evaluate the nature of the parameter. In this regard, when storing the parameter, it may be advisable to associate the parameter with an indication of the nature of the parameter. Examples of this are as follows.

The PBR parameter values may have been obtained in the serving cell as part of system information related to priority-based re-selection or may have been received from a different cell such as a cell of a different or the same RAT that the MS was previously camped on.

Additionally, it may be advisable to determine if the PBR parameter determined was explicitly signalled, either by the serving cell or otherwise as above, or the PBR parameter is derived from a specified or preconfigured default value, or the PBR parameter is derived from a received parameter indicating a default value such as DEFAULT_UTRAN_Qrxlevmin. This affects the accuracy and reliability of the PBR suitability parameter.

It is also possible to determine whether a frequency-specific parameter is available for the correct frequency which have been obtained by means of a prior re-selection or cell selection attempt to a cell on the frequency. Further, it may be advisable to associate with the stored parameter in a data store on the MS, whether a frequency-specific parameter has been obtained by means of decoding the parameter from a cell on the frequency, other than as part of a re-selection attempt. In this instance, the use of a parameter in which the default PBR re-selection parameter is specified rather than signalled may have different precedence levels in relation to a default value signalled in a cell of a different frequency. For example a specified default value, even if frequency specific, may be less reliable than a default frequency value.

In one example, those parameters which have been stored having been obtained from a cell operating on the same frequency as the candidate cell (which may or may not be the serving cell, as above) can be deemed more reliable than those parameters which have been obtained from a cell having a different frequency. One reason for this disparity is the possible configuration of the cells by the mobile network operators, i.e. cells operating on differing frequencies may intentionally have differing suitability requirements. Additionally, those parameters decoded from a re-selection attempt to that cell may have a different reliability since they have been received from the cell itself rather than another cell operating on the same frequency.

In view of the above distinctions in the nature of the PBR parameter, in a preferred embodiment, the following precedence levels may be applied. It is worth noting that these relative precedence levels are merely preferred. Indeed, the PBR parameter may be used in accordance with any particular order.

Preferably, frequency specific parameters for the frequency of the candidate cell take precedence over non-frequency specific parameters which apply to (in addition) frequencies other than that of the candidate cell.

Preferably, parameters obtained while camped on the serving cell take precedence over parameters obtained while camped on another cell or parameters broadcast in another cell.

Preferably, parameters which are specified rather than signalled, in particular default values for parameters, take lower precedence than values which are explicitly signalled (including by means of a DEFAULT value which is signalled).

In a specific example of the above, a frequency specific specified value will take lower precedence than a signalled value associated with a different frequency.

The PBR parameter, when obtained and selected for use, may be considered applicable to one or more cells, for example based on the frequency of the cell and the frequency associated with the parameter. Conventionally, the MS may only attempt to evaluate cells to which the PBR parameter is applicable by using that parameter. As is described above, the PBR parameter, when utilised in the ranking algorithm according to the present disclosure, may be used by the MS to evaluate a cell to which the PBR parameter is not initially applicable. In one example, a cell which operates on a different frequency to that associated with the PBR parameter may be evaluated by the MS using that PBR parameter.

Figure 5:
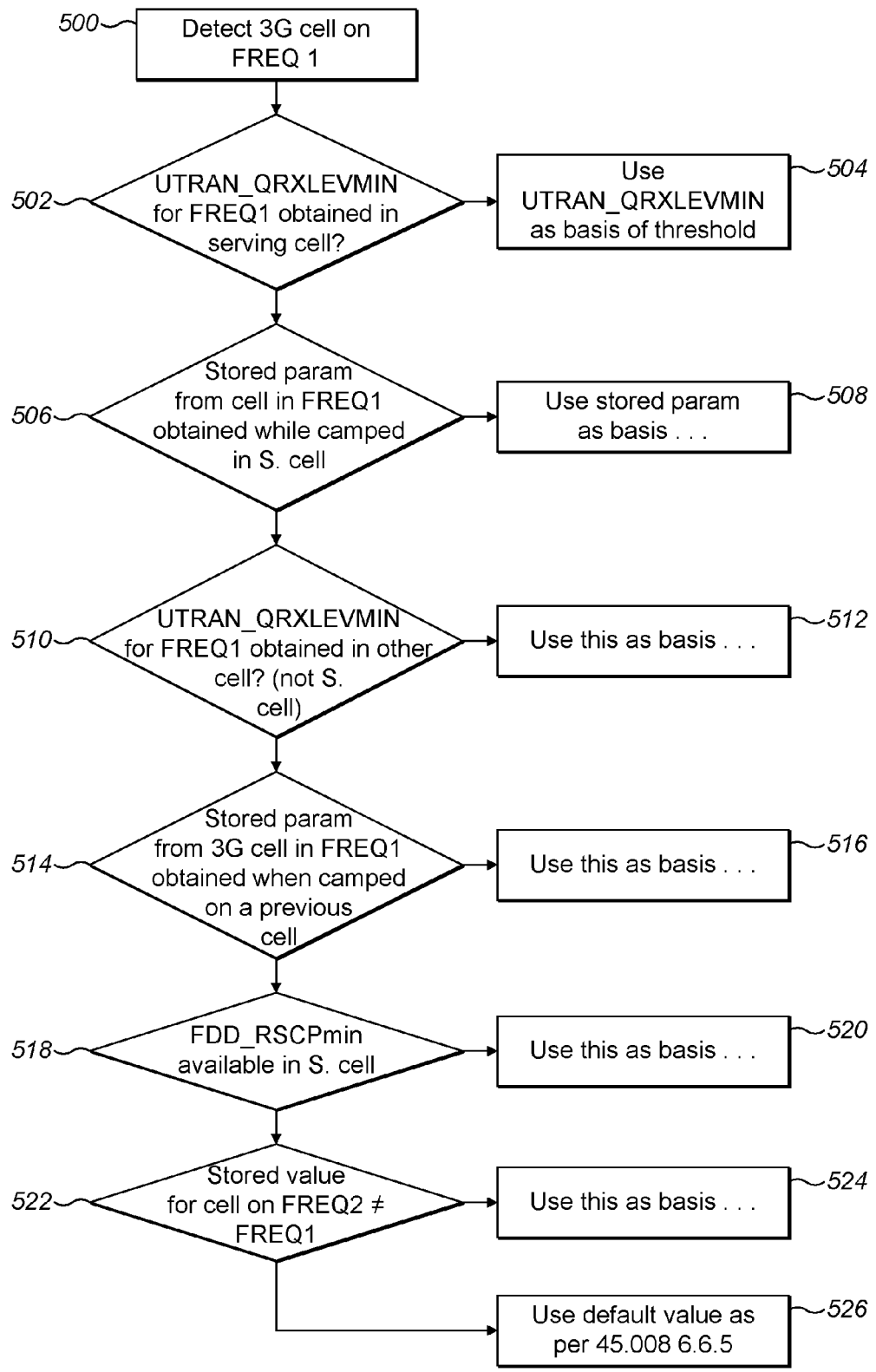
FIG. 5 shows a flow chart illustrating a further example of the present disclosure.

FIG. 5 is a flow chart illustrating a specific and preferred example of the above precedence levels. Again, this ordering is merely exemplary.

At step 500, the process starts with the MS detecting a UTRAN cell operating on frequency FREQ1. This cell will be referred to as the candidate cell in this example. If the MS has acquired a UTRAN_Qrxlevmin value associated with frequency FREQ1 from the serving cell (step 502), in this example a GERAN cell, then this value is used as the basis of the threshold to determine the appropriateness of the cell for re-selection (step 504).

Subsequently, if no PBR parameters are available (the SI2quater message may not have been received completely or the MS or cell may not support this functionality) and if suitability parameters have been obtained from a cell having the same frequency as the candidate cell, FREQ1, while camped in the serving cell (step 506), these parameters should then be used as the basis of the threshold calculation (step 508). In this instance, the suitability parameters may have been stored as the result of the retrieval of system information (SIBs) from a cell having the same RAT and using the same frequency as the candidate cell while camped on the serving cell. This may be as a result of an unsuccessful or successful re-selection attempt, i.e. the MS may have tuned to the frequency of the other cell to decode the system information. The MS may have stored the parameters and associated the parameters with the frequency of the cell for future use (Note that in this case, the candidate cell and the cell from which the parameters were obtained may be the same).

If no suitability parameters have been stored from a cell operating on FREQ1 obtained while camped in the serving cell, then the MS may check if PBR parameters associated with FREQ1 have been obtained in another cell, i.e. not the serving cell (step 510). If these PBR parameters have been acquired, then they can be used as basis of the threshold in the ranking algorithm (step 512).

If no PBR suitability parameters have been have been acquired, then the MS will determine if it can use stored parameters from a UTRAN cell on frequency FREQ1 obtained when camped on a previous cell (step 514). If these are available, the stored parameters can be used as basis of the threshold in the ranking algorithm (step 516).

If there are no stored parameters associated with frequency FREQ1, then the process continues in the known manner. For example, at step 518, if the serving cell makes available the optional FDD_RSCPmin value, then this is used as the basis of the threshold value in the manner indicated in the 45.008 specification (step 520). If a suitability parameter has been stored for a cell which is operating on a different frequency (FREQ2) to the candidate cell, i.e. FREQ2≠FREQ1 (step 522), then this value could then be used as the basis of the threshold (step 524). This value may have been obtained, for example, from a prior re-selection attempt on a cell operating on a frequency FREQ2. As per the 45.008 specification, if none of the above parameters are available to the MS, then the MS should use the DEFAULT value, for example the DEFAULT FDD_Qmin (step 526).

Figure 6:
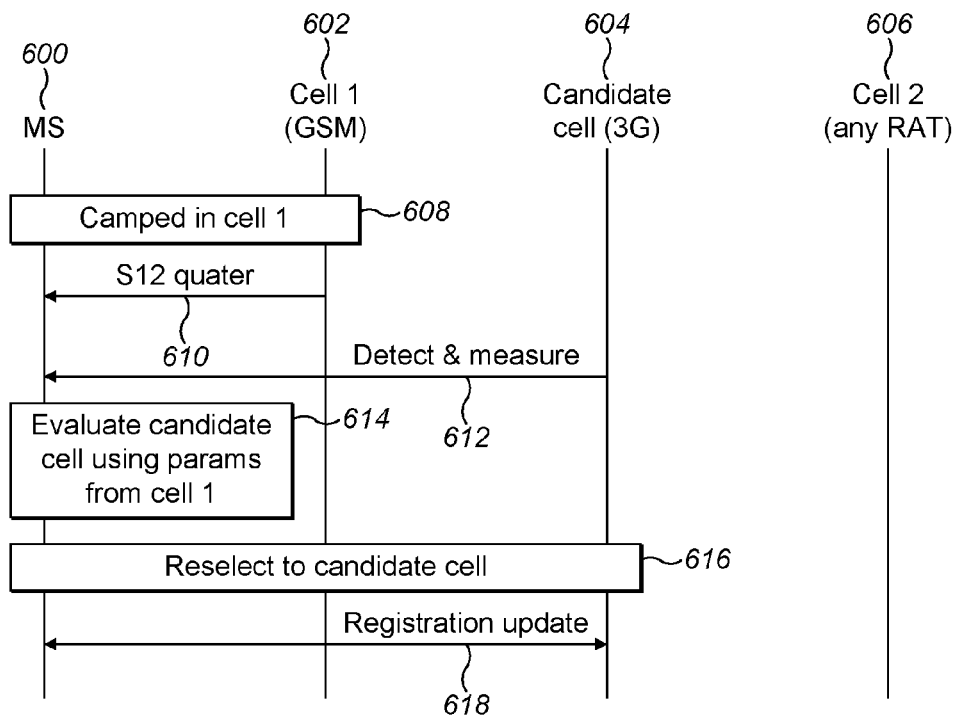
FIG. 6 shows a process illustrating a specific example of the present disclosure; and, FIG. 7 shows a process illustrating a further specific example of the present disclosure.

FIG. 6 shows a specific example of an embodiment. As shown, the MS 600 is camped on a first cell 602 (step 608). This cell is a GSM cell. Whilst camped on this cell 602, the MS 600 receives an SI2quater message from the cell 602 (step 610) which will optionally include one or more PBR parameters which may or may not be associated with a particular frequency depending on the network configuration. The MS may then detect and measure the candidate cell to identify, among others, the signal strength and signal quality (step 612). The MS 600 will then evaluate the candidate cell using the parameters it received as part of the SI2quater, i.e. the UTRAN_Qrxlevmin, associated with the frequency of the candidate cell (step 614). If the candidate cell satisfied the criteria based on the parameter, then the MS 600 will continue with the appropriate subsequent steps to re-select to the candidate cell 604 (step 616). If these steps are successful, then once camped on the cell 604, the MS may perform a registration update (step 618) to inform the network that it is camped on a new cell.

Figure 7:
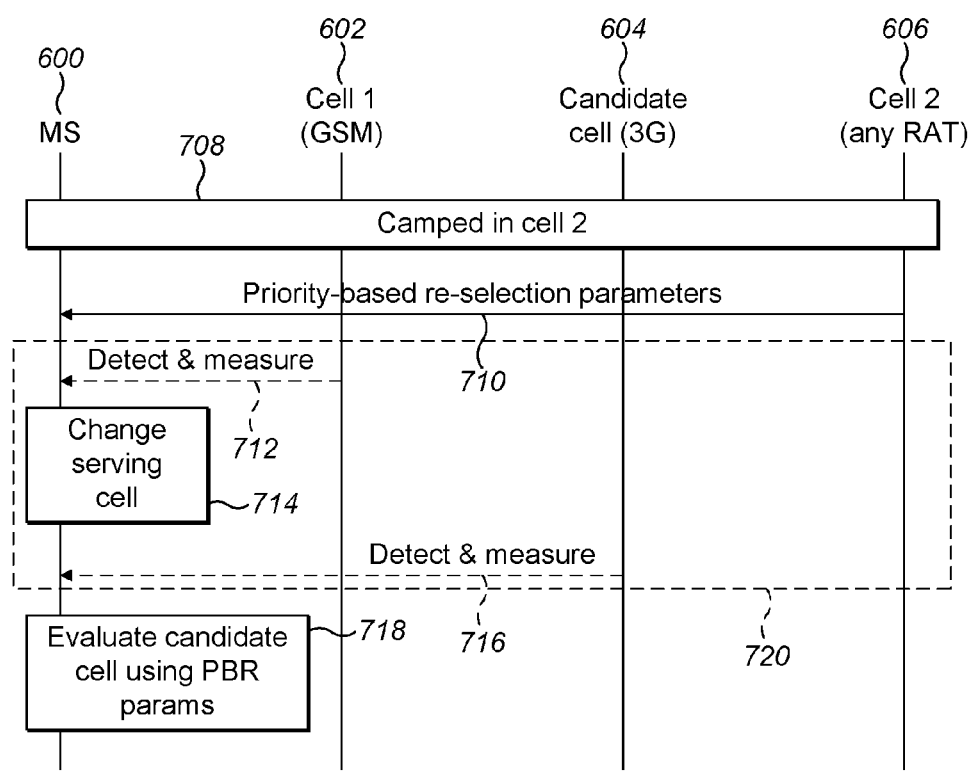

Another specific example is shown in FIG. 7. The exemplary process starts at step 708 with the MS 600 being camped on Cell 2 606. In general, it is not necessary that the MS is camped on Cell 2, this step is merely exemplary. This cell may be of any Radio Access Technology, for example GSM, UMTS or LTE. At step 710, the MS 600 receives priority-based re-selection parameters from the serving cell, in this case Cell 2 606. While in idle mode, the MS 600 detects and measures the characteristics of cell 1 602, which operates using the GSM RAT (step 712). If this cell is suitable and meets the applicable re-selection requirements, the MS 600 re-selects to cell 1 602 (step 714). In this example, the process of switching to cell 1 602 is described as re-selection. However, it will be clear that the portion 720 of the process whereby the MS moves to cell 1 602 may in fact be due to any method of cell change. Examples include handover, re-selection and re-direction among others.

When the MS 600 is camped on the GSM cell 1 602, it may detect and measure the characteristics of the candidate cell 604 which may operate using UMTS RAT (step 716). At this point in the process, the MS 600 has not received priority-based re-selection parameters whilst camped on cell 1 602, either because they are not sent or not yet received. The MS 600 will then evaluate the candidate cell 604 using the stored PBR parameters it received from cell 2 606 when previously camped on it (step 718). If the candidate cell 604 meets the requirements associated with those parameters, then the MS 600 will re-select to that cell (not shown).

With reference to the text of Section 6.6.5 of the 45.008 specification, a specific example embodying the principles of the present disclosure is as follows: "[ . . . ]

The MS shall then reselect a suitable (see 3GPP TS 25.304) UTRAN cell if:
  for a TDD cell the measured RSCP value is equal to or greater than TDD_Qoffset for a period of 5 s and
  for an FDD cell the following criteria are all met for a period of 5 s:
    1. its measured RSCP value exceeds the value of RLA_C for the serving cell and all of the suitable (see 3GPP TS 43.022) non-serving GSM cells by the value FDD_Qoffset,
    2. its measured Ec/No value is equal or greater than the value FDD_Qmin−FDD_Qmin_Offset, and
    3. its measured RSCP value is equal to or greater than FDD_RSCP_threshold.

In case of a cell re-selection occurring within the previous 15 seconds, FDD_Qoffset or TDD_Qoffset is increased by 5 dB.

Ec/No and RSCP are the measured quantities, see subclause 8.1.5.

FDD_RSCP_threshold equals:
  UTRAN QRXLEVMIN+10 dB, if UTRAN QRXLEVMIN for the frequency of the UTRAN cell is broadcast in the serving cell, else
  Qrxlevmin+Pcompensation+10 dB, if these parameters are available and have been obtained by a cell operating on the same frequency as the candidate cell, else
  UTRAN QRXLEVMIN+10 dB, if where UTRAN QRXLEVMIN for the frequency of the UTRAN cell is broadcast in a cell other than the serving cell, else
  FDD RSCPmin−min((P MAX−21 dBm), 3 dB), if FDD RSCPmin is broadcast on the serving cell, else
  Qrxlevmin+Pcompensation+10 dB, if these parameters are available and have been obtained by a cell operating on a different frequency,
  otherwise, the default value of FDD_RSCPmin.

Qrxlevmin is the minimum required RX level in the UTRAN FDD cell (dBm), see 3GPP TS 25.304.

Pcompensation is max(UE_TXPWR_MAX_RACH−P_MAX, 0) (dB), see 3GPP TS 25.304.

UE_TXPWR_MAX_RACH is the maximum TX power level an MS may use when accessing the UTRAN FDD cell on RACH (dBm), see 3GPP TS 25.304.

P_MAX is the maximum RF output power of the MS (dBm) in UTRAN FDD mode, see 3GPP TS 25.304.

FDD_Qmin, FDD_Qoffset and optionally FDD_RSCPmin and FDD_Qmin_Offset are broadcast on BCCH of the serving cell.

TDD_Qoffset is broadcast on BCCH of the serving cell.

Note 1: The parameters required to determine if the UTRAN cell is suitable are broadcast on BCCH of the UTRAN cell. An MS may start re-selection towards the UTRAN cell before decoding the BCCH of the UTRAN cell, leading to a short interruption of service if the UTRAN cell is not suitable.

Note 2: If FDD_RSCPmin is broadcast, optimum GSM to UTRAN re-selection performance is achieved if UTRAN cells at UTRAN coverage border areas are planned for +24 dBm UE power.

Note 3: The parameter TDD_Qoffset is an absolute threshold for re-selection towards a target UTRAN TDD cell.

The MS shall store the UTRAN cell RSCP suitability criterion parameters above, whenever decoded from a UTRAN FDD cell of an equivalent PLMN while attempting to camp on the UTRAN FDD cell. The most recently decoded parameters from one UTRAN FDD cell of an equivalent PLMN are valid re-selection criteria towards all UTRAN FDD cells. This list of parameters shall be cleared after PLMN selection (see 3GPP TS 23.122). In addition, the MS may store the UTRAN QRXLEVMIN parameters together with their associated frequency(ies) whenever decoded from any cell in the same PLMN (or equivalent PLMN) as the serving cell; only the most recently received parameters for a given frequency shall be used.

Note 4: UTRAN QRXLEVMIN may be signalled explicitly or implicitly, by means of the DEFAULT UTRAN QRXLEVMIN field (see 3GPP TS 44.018).

Note 5: The cell from which the UTRAN_QRXLEVMIN values were obtained need not be a GSM cell."

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present disclosure are not limited to any particular operating system, system architecture, mobile device architecture, server architecture, or computer programming language.

The various embodiments presented above are merely examples and variations of the innovations described herein will be apparent to persons of ordinary skill in the art. As embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

It is to be noted that the methods as described have actions carried out in a particular order. However, it will be clear that the order of any actions performed, where the context permits, can be varied and thus the ordering as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a wireless telecommunications device or UTRAN or other user equipment or access network components, a combination of multiple such components for example in communication with one another or a sub-network or full network of such components.

Embodiments have been described here in relation to 3GPP specifications. However the method an apparatus described are not intended to be limited to the specifications or the versions thereof referred to herein but may be applicable to future versions or other specifications.

The invention claimed is:

1. A method for use by a wireless cellular telecommunications device camped on a first cell, the method comprising, at the device:
    selecting a parameter applicable to a priority-based re-selection algorithm and also applicable to another cell;
    measuring an attribute of a signal received from a second cell;
    evaluating the second cell for re-selection according to a ranking algorithm based at least on the selected parameter and the measured attribute;
    if the device fails to determine a parameter applicable to a priority-based re-selection algorithm and also applicable to another cell, evaluating the second cell based at least on the measured attribute and a first stored suitability parameter obtained from a system information block of a cell; and
    if the first stored suitability parameter is not available, evaluating the second cell based at least on the measured attribute and a second stored suitability parameter which is obtained from a system information block of a cell, the second stored suitability parameter being associated with a frequency on which the second cell does not operate.

2. The method according to claim 1, further comprising performing re-selection from the first cell to the second cell based on the evaluation.

3. The method according to claim 1, in which the evaluation includes determining if the cell meets re-selection requirements and in which the second cell is determined not to meet the re-selection requirements if the measured attribute fails to exceed the selected parameter by a pre-determined amount.

4. The method according to claim 3, in which the pre-determined amount is zero.

5. The method according to claim 3, in which the pre-determined amount is ten decibels (dB).

6. The method according to claim 1, in which the selecting a parameter applicable to a priority-based re-selection algorithm and also applicable to another cell includes decoding the parameter from system information received in the first cell.

7. The method according to claim 1, in which the selecting a parameter applicable to a priority-based re-selection algorithm and also applicable to another cell, includes retrieving the parameter from a data store on the device, the parameter being stored by the device when the device was previously camped on a third cell.

8. The method according to claim 7, in which the device has a stored indication of how said parameter was obtained.

9. The method according to claim 1, in which the parameter is associated with one or more specific frequencies and is only applicable to cells operating on the one or more specific frequencies.

10. The method according to claim 1, in which the parameter is associated with a specific frequency and is only applicable to cells operating on that frequency.

11. The method according to claim 1, in which the first stored suitability parameter is associated with a frequency on which the second cell operates.

12. The method according to claim 1, wherein the first cell is a cell of a GSM EDGE Radio Access Network (GERAN).

13. The method according to claim 1, in which the parameter indicates a minimum required receive level.

14. The method according to claim 1, in which the measured attribute is received signal code power (RSCP).

15. The method according to claim 1, in which the first and second cells are of the same wireless radio network.

16. The method according to claim 1, in which the first and second cells are of different wireless radio networks.

17. The method according to claim 1, in which the first and second cells are of the same wireless radio access technology.

18. The method according to claim 1, in which the first and second cells are of different wireless radio access technologies.

19. A wireless cellular telecommunications device that:
camps on a first cell;
selects a parameter applicable to a priority-based re-selection algorithm and also applicable to another cell;
measures an attribute of a signal received from a second cell;
evaluates the second cell for re-selection according to a ranking algorithm based at least on the selected parameter and the measured attribute;
if the device fails to determine a parameter applicable to a priority-based re-selection algorithm and also applicable to another cell, the device further evaluates the second cell based at least on the measured attribute and a first stored suitability parameter obtained from a system information block of a cell; and
if the first stored suitability parameter is not available, the device further evaluates the second cell based at least on the measured attribute and a second stored suitability parameter which is obtained from a system information block of a cell, the second stored suitability parameter being associated with a frequency on which the second cell does not operate.

20. The wireless cellular telecommunications device according to claim 19, in which the device further performs re-selection from the first cell to the second cell based on the evaluation.

21. The wireless cellular telecommunications device according to claim 19, in which the evaluation includes determining if the cell is suitable for re-selection and in which the second cell is determined not to be suitable if the measured attribute fails to exceed the parameter by a pre-determined amount.

22. The wireless cellular telecommunications device according to claim 21, in which the pre-determined amount is zero.

23. The wireless cellular telecommunications device according to claim 21, in which the pre-determined amount is ten decibels (dB).

24. The wireless cellular telecommunications device according to claim 19, in which the selecting a parameter applicable to a priority-based re-selection algorithm and also applicable to another cell includes decoding the parameter from system information received in the first cell.

25. The wireless cellular telecommunications device according to claim 19, in which the selecting a parameter applicable to a priority-based re-selection algorithm and also applicable to another cell, includes retrieving the parameter from a data store on the device, the parameter being stored by the device when the device was previously camped on a third cell.

26. The wireless cellular telecommunications device according to claim 24, in which the device has a stored indication of how said parameter was obtained.

27. The wireless cellular telecommunications device according to claim 19, in which the parameter is only applicable to cells operating on one or more specific frequencies.

28. The wireless cellular telecommunications device according to claim 19, in which the parameter is associated with a specific frequency and is only applicable to cells operating on that frequency.

29. The wireless cellular telecommunications device according to claim 19, in which the first stored suitability parameter is associated with a frequency on which the second cell operates.

30. The wireless cellular telecommunications device according to claim 19, wherein the first cell is a cell of a GSM EDGE Radio Access Network (GERAN).

31. The wireless cellular telecommunications device according to claim 19, in which the parameter indicates a minimum required receive level.

32. The wireless cellular telecommunications device according to claim 19, in which the measured attribute is received signal code power (RSCP).

33. The wireless cellular telecommunications device according to claim 19, in which the first and second cells are of the same wireless radio network.

34. The wireless cellular telecommunications device according to claim 19, in which the first and second cells are of different wireless radio networks.

35. The wireless cellular telecommunications device according to claim 19, in which the first and second cells are of the same wireless radio access technology.

36. The wireless cellular telecommunications device according to claim 19, in which the first and second cells are of different wireless radio access technologies.

37. A non-transitory computer-readable storage medium having stored thereon instructions which can be executed by a device to carry out the actions of:
camping on a first cell;
selecting a parameter applicable to a priority-based re-selection algorithm and also applicable to another cell;
measuring an attribute of a signal received from a second cell;

evaluating the second cell for re-selection according to a ranking algorithm based at least on the selected parameter and the measured attribute;

if the device fails to determine a parameter applicable to a priority-based re-selection algorithm and also applicable to another cell, evaluating the second cell based at least on the measured attribute and a first stored suitability parameter obtained from a system information block of a cell; and if the first stored suitability parameter is not available, evaluating the second cell based at least on the measured attribute and a second stored suitability parameter which is obtained from a system information block of a cell, the second stored suitability parameter being associated with a frequency on which the second cell does not operate.

* * * * *